United States Patent [19]

Roberts et al.

[11] Patent Number: 5,095,249

[45] Date of Patent: Mar. 10, 1992

[54] GAS PROBE STARTER FOR AN ELECTRODELESS HIGH INTENSITY DISCHARGE LAMP

[75] Inventors: Victor D. Roberts, Burnt Hills, N.Y.; James T. Dakin; Mark E. Duffy, both of Shaker Heights, Ohio; Raymond A. Heindl, Euclid, Ohio

[73] Assignee: General Electric Company, Schenectady, N.Y.

[21] Appl. No.: 622,247

[22] Filed: Dec. 4, 1990

[51] Int. Cl.$^5$ ............................................ H05B 41/16
[52] U.S. Cl. ................................. 315/248; 315/344; 313/234
[58] Field of Search ............... 315/248, 39, 344, 85, 315/348, 267; 313/234, 607

[56] References Cited

U.S. PATENT DOCUMENTS

| | | | |
|---|---|---|---|
| 4,810,938 | 3/1989 | Johnson et al. | 315/248 |
| 4,812,702 | 3/1989 | Anderson | 313/153 |
| 4,894,589 | 1/1990 | Borowiec | 315/248 |
| 4,894,590 | 1/1990 | Witting | 315/248 |
| 4,902,937 | 2/1990 | Witting | 315/248 |
| 4,959,584 | 9/1990 | Anderson | 313/160 |

OTHER PUBLICATIONS

Ingold, John H.; "Glow Discharges at Low Frequences"; *Gaseous Electronics*, vol. I, edited by M. N. Hirsh and H. J. Oskam, Academic Press, N.Y.; 1978, pp. 19-20.

Primary Examiner—Eugene R. LaRoche
Assistant Examiner—A. Zarabian
Attorney, Agent, or Firm—Jill M. Breedlove; James C. Davis, Jr.; Marvin Snyder

[57] ABSTRACT

A gas probe starter for an electrodeless high intensity discharge (HID) lamp includes a fixed starting electrode for coupling a starting voltage to a chamber which is attached to the outer wall of the arc tube and contains a gas. The gas in the starting chamber, which is preferably at a low pressure relative to that of the arc tube fill, is switched between conducting and nonconducting states corresponding to lamp-starting and normal running operation, respectively. To start the lamp, the starting voltage is applied to the starting electrode, causing a discharge current to flow in the gas chamber which, in turn, results in the capacitive coupling of a sufficiently high voltage to the arc tube in order to initiate an arc discharge therein. After the arc discharge is initiated, the starting voltage is substantially reduced so that the discharge current in the starting chamber is extinguished.

16 Claims, 4 Drawing Sheets

GAS PROBE STARTER FOR AN ELECTRODELESS HIGH INTENSITY DISCHARGE LAMP

RELATED PATENT APPLICATIONS

This patent application is related to commonly assigned U.S. patent application of Dakin et al., entitled "A Starting Aid for an Electrodeless HID Lamp", Ser. No. 07/622,026, and to commonly assigned U.S. patent application of J.P. Cocoma and G.A. Farrall, entitled "Starting Circuit for an Electrodeless High Intensity Discharge Lamp", Ser. No. 07/622,024, and to commonly assigned U.S. patent application of G.A. Farrall and J.P. Cocoma, entitled "Two-Stage Resonant Starting Circuit for an Electrodeless High Intensity Discharge Lamp", Ser. No. 07/622,246, which patent applications are filed concurrently herewith and incorporated by reference herein.

FIELD OF THE INVENTION

The present invention relates generally to electrodeless high intensity discharge lamps and, more particularly, to a gas probe starter for an electrodeless high intensity discharge (HID) lamp including a fixed starting electrode coupled to a gas discharge chamber containing a gas which may be switched between conducting and nonconducting states corresponding to lamp-starting and normal running operation, respectively.

BACKGROUND OF THE INVENTION

In a high intensity discharge (HID) lamp, a medium to high pressure ionizable gas, such as mercury or sodium vapor, emits visible radiation upon excitation typically caused by passage of current through the gas. One class of HID lamps comprises electrodeless lamps which generate an arc discharge by generating a solenoidal electric field in a high-pressure gaseous lamp fill. In particular, the lamp fill, or discharge plasma, is excited by radio frequency (RF) current in an excitation coil surrounding an arc tube. The arc tube and excitation coil assembly acts essentially as a transformer which couples RF energy to the plasma. That is, the excitation coil acts as a primary coil, and the plasma functions as a single-turn secondary. RF current in the excitation coil produces a time-varying magnetic field, which in turn creating an electric field in the plasma which closes completely upon itself, i.e., a solenoidal electric field. Current flows as a result of this electric field, resulting in a toroidal arc discharge in the arc tube.

At room temperature, the solenoidal electric field produced by the excitation coil is typically not high enough to ionize the gaseous fill and thus initiate the arc discharge. One way to overcome this shortcoming is to lower the gas pressure of the fill, for example, by first immersing the arc tube in liquid nitrogen so that the gas temperature is decreased to a very low value and then allowing the gas temperature to increase. As the temperature rises, an optimum gas density is eventually reached for ionization, or breakdown, of the fill to occur so that an arc discharge is initiated. However, the liquid nitrogen method of initiating an arc discharge is not practical for widespread commercial use.

More recent methods for starting electrodeless HID lamps entail using starting aids to capacitively couple the high voltage developed across the excitation coil turns into the arc tube. As a result of this voltage gradient, a capacitive current flows between the starting aid and the excitation coil, and hence through the arc tube, thereby ionizing the gaseous fill and producing a low current discharge therein. When the gas is sufficiently ionized, a transition is made from a relatively low current discharge to a relatively high current, high intensity solenoidal arc discharge. Such a starting aid may comprise, for example, a pair of capacitive starting electrodes, as described in U.S. Pat. No. 4,902,937 of H.L. Witting, issued Feb. 20, 1990, and assigned to the instant assignee, which patent is incorporated by reference herein. Each starting electrode comprises a conductive ring which surrounds the arc tube and is connected to the excitation coil of the HID lamp. Coupling a high voltage signal between the pair of starting electrodes causes an electric field to be produced therebetween which is of sufficient magnitude to create a discharge in the arc tube due to the arc tube wall capacitance. Furthermore, as it has been determined that the application of relatively large electric fields directly to the arc tube via the starting aid may cause early arc tube degradation, heat sensitive members, e.g. bimetallic strips, are utilized for moving the starting electrodes away from the arc tube after initiating an arc discharge, thereby preserving the useful life of the lamp.

A spiral starting electrode for an electrodeless HID lamp is described in U.S. Pat. No. 4,894,590 of H.L. Witting, issued Jan. 16, 1990, and assigned to the instant assignee, which patent is incorporated by reference herein. A single, conical-spiral-shaped starting electrode is positioned so that its narrower end is adjacent to, or on, the arc tube surface. The wider end of the starting electrode is positioned so that flux generated by the excitation coil cuts the turns of the spiral electrode, thereby generating a high voltage signal which results in a sufficiently high electric field gradient to create a discharge in the arc tube. A bimetallic strip is utilized to move the starting electrode away from the arc tube after an arc discharge is initiated therein.

Starting electrodes which are moved from a rest position to a starting location adjacent to the arc tube by piezoelectric means are described in U.S. Pat. No. 4,894,589 of J.C. Borowiec, issued Jan. 16, 1990, and assigned to the instant assignee, which patent is incorporated by reference herein. The piezoelectric means is deactivated after an arc discharge is initiated, and the starting electrodes are moved back to the rest position. The piezoelectric means allows selective movement of the starting electrodes, thereby enabling the lamp to be restarted, if necessary, even if the arc tube is still hot.

In commonly assigned, copending U.S. patent application of H.L. Witting, Ser. No. 417,404, filed Oct. 5, 1989, another starting aid for an electrodeless HID lamp is described which comprises a first conductive coil disposed about a second conductive coil, each coil having a truncated-cone shape. The coils are wound in opposite directions so that voltages induced therein add together to provide a sufficiently high electric field gradient to initiate an arc discharge in the arc tube. A bimetallic support is used to move the starting aid between a starting position adjacent to the arc tube and a lamp-operating position at a predetermined location away from the arc tube. The Witting application is incorporated by reference herein.

Although each of the hereinabove described movable starting aids is effective in initiating an arc discharge in an electrodeless HID lamp, it may be desirable in some applications to simplify lamp construction by employing a fixed starting aid. Such a fixed starting aid may comprise, for example, electrodes extending into the arc tube, such as those described in commonly assigned U.S. Pat. No. 4,959,584 of J.M. Anderson, issued Sept. 25, 1990, which patent is incorporated by reference herein. Although such starting electrodes are effective in starting an HID lamp, a disadvantage of such fixed electrodes is that even after the starting voltage is removed therefrom, the electrodes act as small antennae, picking up RF electric fields which cause small currents to flow between the arc discharge and the starting aid. These currents have a detrimental effect on the arc tube. Therefore, to be practical, such a fixed starting aid must include means for substantially reducing, or eliminating, currents flowing between the starting aid and the arc tube during normal lamp operation, thereby extending the useful life of the lamp.

OBJECTS OF THE INVENTION

Accordingly, an object of the present invention is to provide a new and improved fixed starting aid for an electrodeless HID lamp.

Another object of the present invention is to provide a reliable fixed starting aid for an electrodeless HID lamp which avoids the introduction of leakage currents into the arc tube during normal lamp operation.

Still another object of the present invention is to provide a new and improved gas probe starter for an electrodeless HID lamp.

Yet another object of the present invention is to provide a gas probe starter for an electrodeless HID lamp including a fixed starting electrode and a discharge chamber containing a gas which may be switched between conducting and nonconducting states corresponding to lamp-starting and normal running operation, respectively, so as to avoid the presence of leakage currents after initiation of the arc discharge, thereby extending the useful life of the lamp.

SUMMARY OF THE INVENTION

These and other objects of the present invention are achieved in a gas probe starter for an electrodeless HID lamp including a fixed starting electrode coupled to a starting chamber which is attached to the arc tube and contains a gas. Preferably, the gas in the starting chamber is at a relatively low pressure as compared with that of the arc tube fill. In the chamber, the gas may be switched between conducting and nonconducting states corresponding to lamp-starting and normal running operation, respectively. In particular, during lamp-starting, a starting voltage is applied to the starting electrode, which causes the gas in the chamber to become conductive. As a result, a sufficiently high voltage is capacitively coupled to the inside surface of the arc tube to break down the gaseous fill contained therein, thus initiating an arc discharge. After the lamp has started, the starting voltage is removed from the starting electrode in order to extinguish the relatively low discharge current in the chamber. In this way, leakage currents flowing between the starting electrode and the arc tube are avoided, thereby extending the useful life of the lamp.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1A:
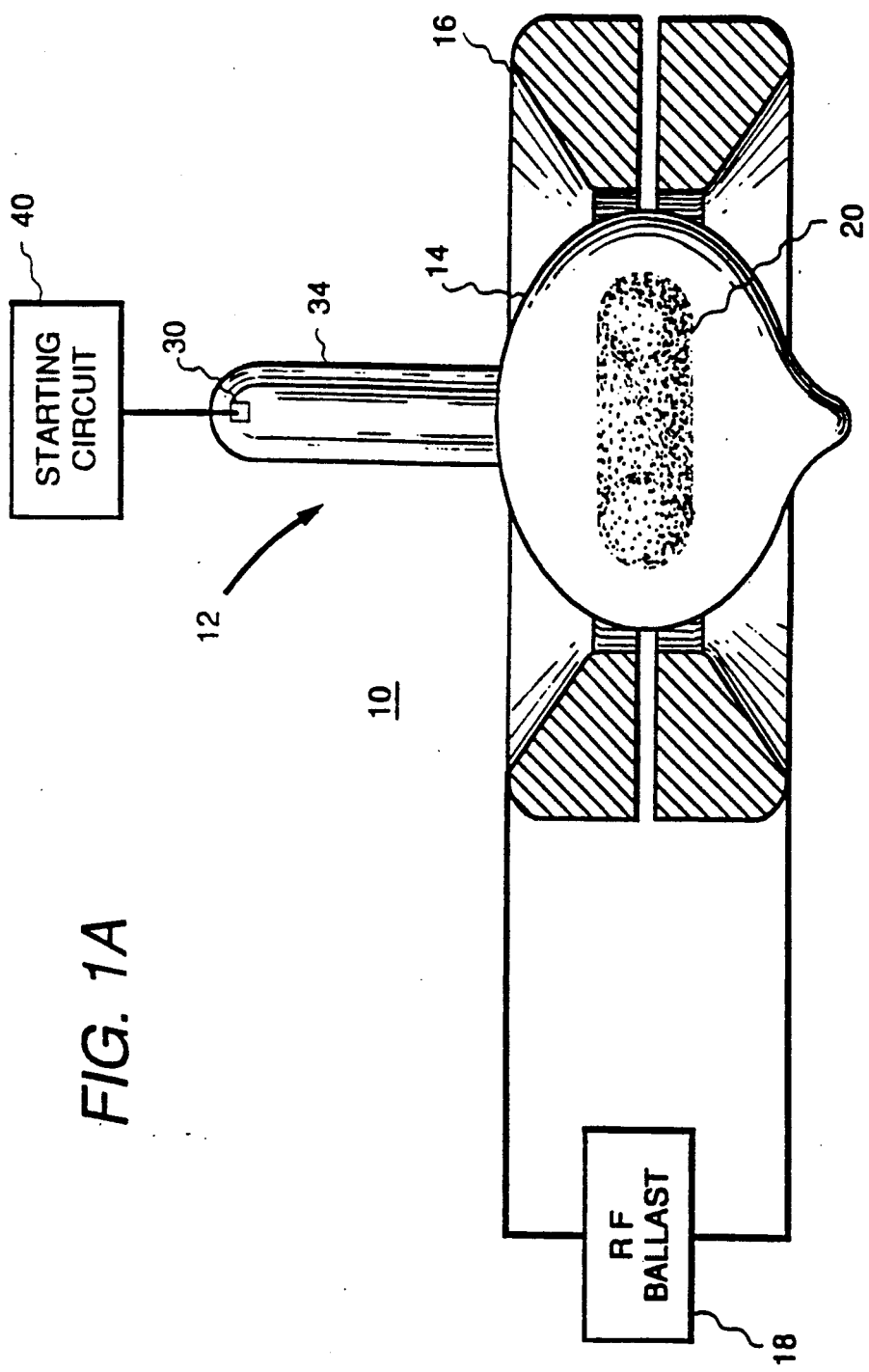
FIG. 1A is a partially cutaway side view of an electrodeless HID lamp employing a gas probe starter in accordance with the present invention.

FIG. 1A illustrates an electrodeless HID lamp 10 employing a gas probe starter 12 in accordance with a preferred embodiment of the present invention. Lamp 10 includes an arc tube 14 preferably formed of a high temperature glass, such as fused quartz, or an optically transparent or translucent ceramic, such as polycrystalline alumina. An excitation coil 16 surrounds arc tube 14 and is coupled to a radio frequency (RF) ballast 18 for exciting a toroidal arc discharge 20 therein. By way of example, arc tube 14 is shown as having a substantially ellipsoid shape. However, arc tubes of other shapes may be desirable, depending upon the application. For example, arc tube 14 may be spherical or may have the shape of a short cylinder, or "pillbox", having rounded edges, if desired.

Arc tube 14 contains a fill in which an arc discharge having a substantially toroidal shape is excited during lamp operation. A suitable fill is described in U.S. Pat. No. 4,810,938 of P.D. Johnson, J.T. Dakin and J.M. Anderson, issued on Mar. 7, 1989, and assigned to the instant assignee. The fill of the Johnson et al. patent comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. Another suitable fill is described in copending U.S. patent application of H.L. Witting, Ser. No. 348,433, filed May 8, 1989, and assigned to the instant assignee, which patent application is incorporated by reference herein. The fill of the Witting application comprises a combination of a lanthanum halide, a sodium halide, a cerium halide and xenon or krypton as a buffer gas. For example, a fill according to the Witting application may comprise a combination of lanthanum iodide, sodium iodide, cerium iodide, and 250 torr partial pressure of xenon.

As illustrated in FIG. 1A, RF power is applied to the HID lamp by RF ballast 18 via excitation coil 16 coupled thereto. Excitation coil 16 is illustrated as comprising a two-turn coil having a configuration such as that described in commonly assigned, copending U.S. patent application of G.A. Farrall, Ser. No. 493,266, filed Mar. 14, 1990, which patent application is incorporated by reference herein. Such a coil configuration results in very high efficiency and causes only minimal light blockage from the lamp. The overall shape of the excitation coil of the Farrall application is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned U.S. Pat. No. 4,812,702 of J.M. Anderson, issued Mar. 14, 1989, which patent is incorporated by reference herein. In particular, the Anderson patent describes a coil having six turns which are arranged to have a substantially V-shaped cross section on each side of a coil center line. Still another suitable excitation coil may be of solenoidal shape, for example.

In operation, RF current in coil 16 results in a time-varying magnetic field which produces within arc tube 14 an electric field that completely closes upon itself. Current flows through the fill within arc tube 14 as a result of this solenoidal electric field, producing toroidal arc discharge 20 therein. Suitable operating frequencies for RF ballast 18 are in the range from 0.1 to 300 megahertz (MHz), exemplary operating frequencies being 6.78 MHz and 13.56 MHz.

Figure 1B:
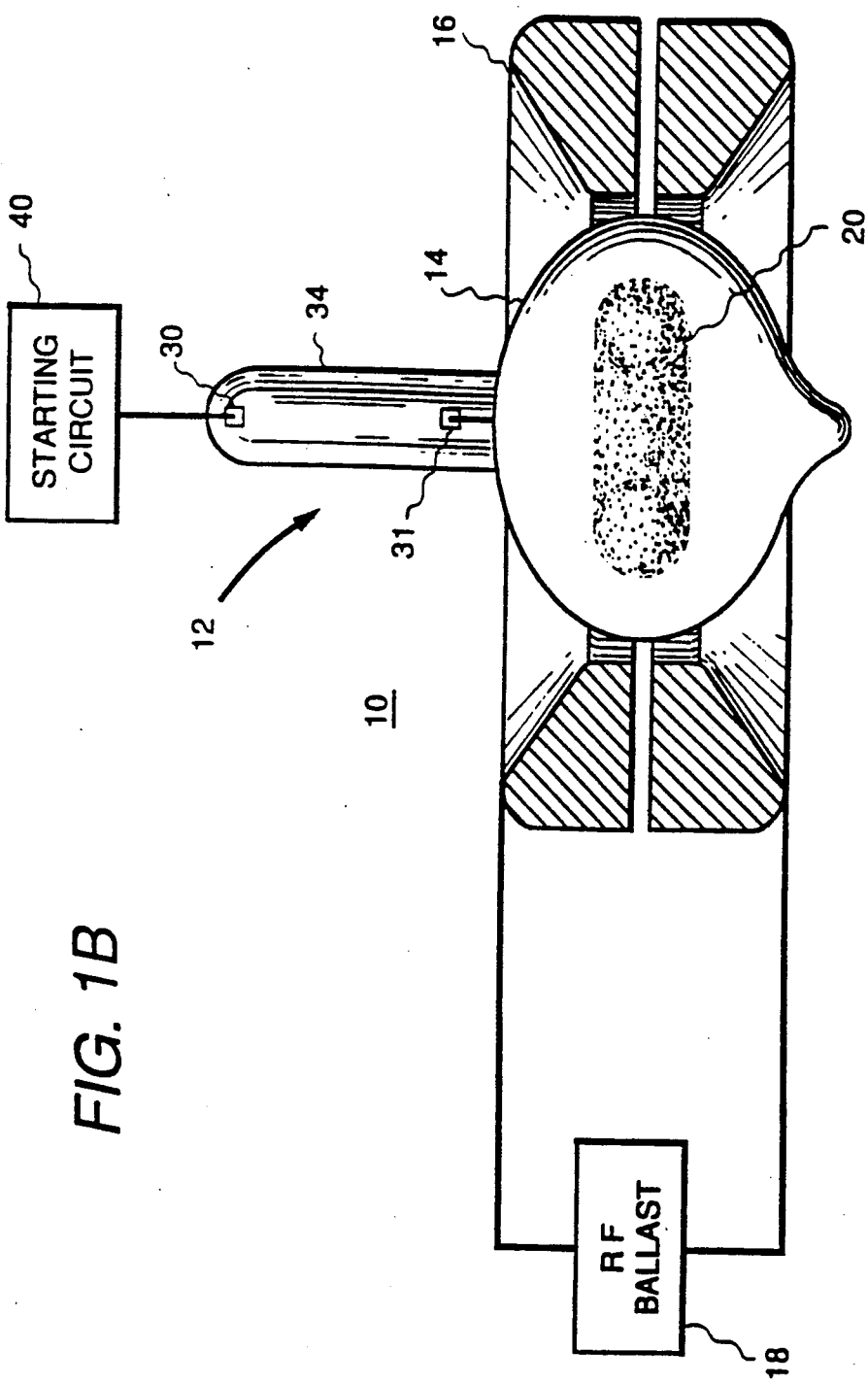
FIG. 1B is a partially cutaway side view of an electrodeless HID lamp employing a gas probe starter in accordance with an alternative embodiment of the present invention.

As shown in FIG. 1A, gas probe starter 12 comprises a starting electrode 30 coupled to a starting chamber 34 which is attached to the outer wall of arc tube 14 and contains a gas. Specifically, in FIG. 1A, starting electrode 30 is shown being situated within the interior of chamber 34. However, other suitable configurations (not shown) include situating the electrode outside the chamber and either in contact with or in close proximity to the chamber. In another alternative embodiment, as shown in FIG. 1B, another electrode 31 is situated in chamber 34 at the opposite end thereof proximate to the arc tube.

The gas in starting chamber 34 may comprise, for example, a rare gas, such as neon, krypton, xenon, argon, helium, or mixtures thereof, at a pressure in the range from approximately 0.5 to 500 torr, a preferred range being from approximately 5 to 40 torr. Preferably, the gas in chamber 34 is at a relatively low pressure as compared with that of the arc tube fill in order to promote even easier starting. For example, a suitable arc tube fill pressure may be approximately 200 torr while that of the gas in chamber 34 may be approximately 20 torr.

In order to start lamp 10, a starting voltage is applied to electrode 30 via a starting circuit 40, causing the gas in chamber 34 to break down, or ionize, and thus become conductive. In FIG. 1A, the relatively low discharge current flows between electrode 30 and the arc tube wall. In FIG. 1B, the discharge current flows between electrode 30 and electrode 31. The discharge in the starting chamber may be characterized as either a glow discharge or an arc discharge, depending upon the pressure of the gas in chamber 34. At the low-end of the aforementioned gas pressure range, the discharge is more likely to be characterized as a glow, while at the high-end of the gas pressure range, the discharge is more likely to be characterized as an arc. However, there is no generally accepted definition which distinguishes between glow and arc discharges. For example, as described by John H. Ingold in "Glow Discharges at DC and Low Frequencies" from *Gaseous Electronics*, vol. I, edited by M.N Hirsh and H.J. Oskam, Academic Press, New York, 1978, pp. 19-20, one definition is based on electrode-related phenomena, and another is based on electron and particle temperatures.

As a result of the discharge current in starting chamber 34, a sufficiently high starting voltage is capacitively coupled to the inside surface of arc tube 14 which causes the high-pressure gaseous fill contained therein to break down, thereby initiating arc discharge 20. Once the arc discharge is initiated, the starting voltage is either removed from starting electrode 30, or the magnitude thereof is decreased to a sufficiently low value, so that the discharge current in chamber 34 is extinguished. That is, the gas contained in chamber 34 becomes essentially nonconductive, thus providing a high-impedance path between starting electrode 30 and arc tube 14. Hence, the arc tube is protected during lamp operation from capacitively coupled currents which would otherwise flow between the starting electrode and the arc tube.

Figure 2:
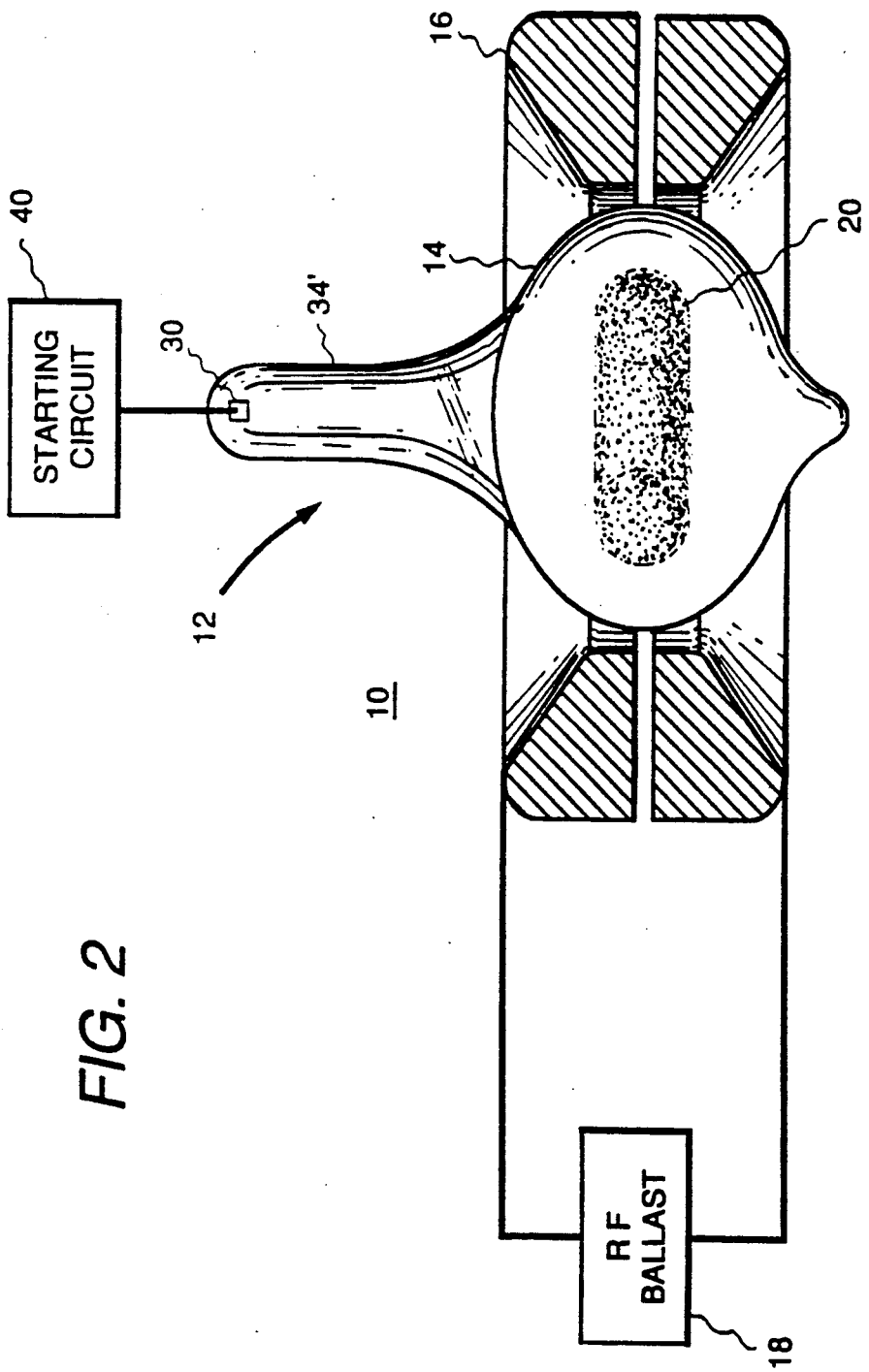
FIG. 2 is a partially cutaway side view of an electrodeless HID lamp employing a gas probe starter in accordance with an alternative embodiment of the present invention.

An alternative embodiment of the HID lamp starter of the present invention is shown in FIG. 2. A starting chamber 34' for containing a gas is illustrated as having a wider portion in contact with arc tube 14 than that of starting chamber 34 of FIG. 1A. The increased contact area between arc tube 14 and chamber 34' increases the capacitive coupling therebetween and hence provides even more reliable starting.

Figure 3:
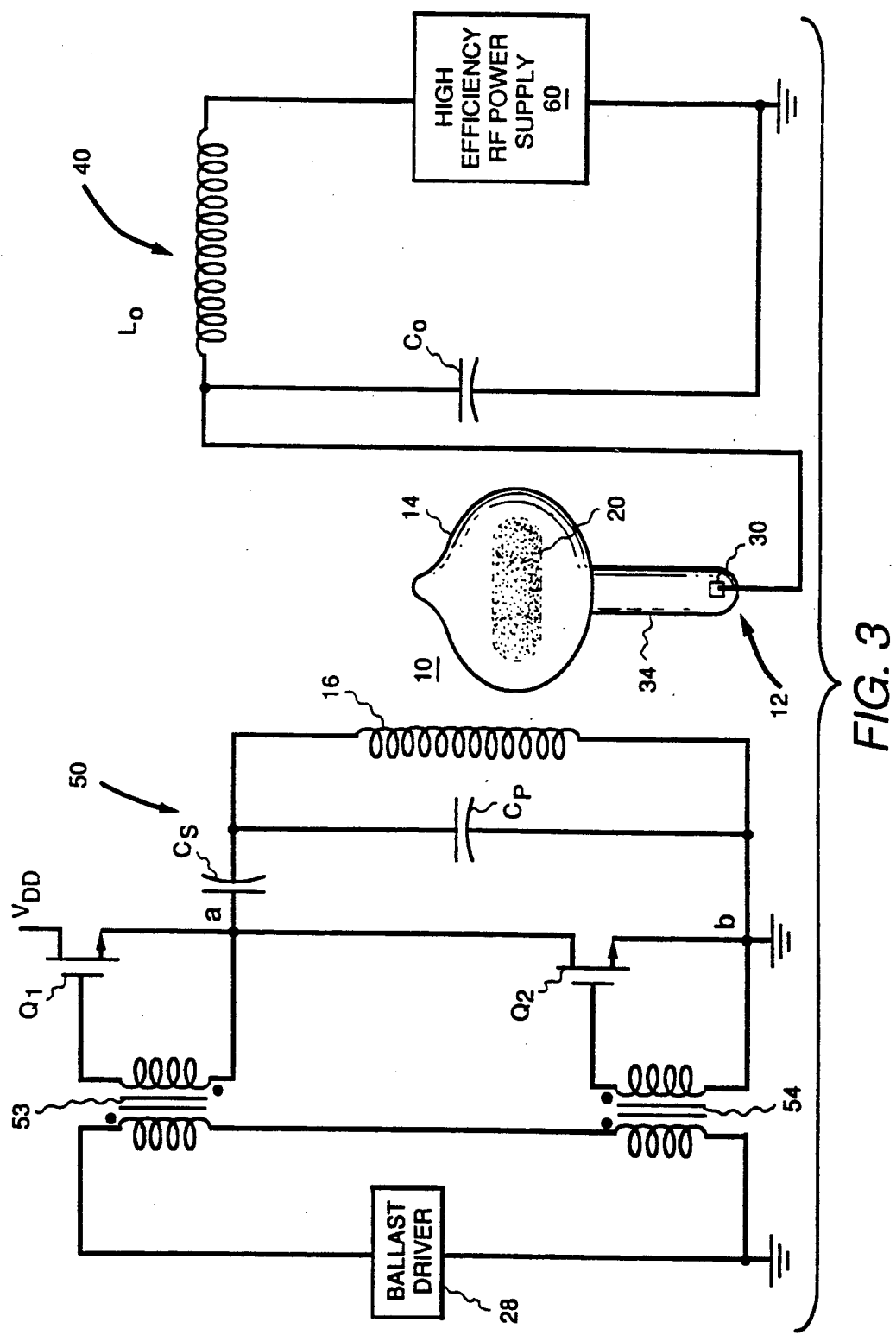
FIG. 3 is a schematic illustration of an electrodeless HID lamp system including a starting circuit suitable for applying a starting voltage to a gas probe starter of the present invention.

FIG. 3 illustrates an electrodeless HID lamp system including starter 12, a ballast 18, and a suitable starting circuit 40 for applying a starting voltage to starting electrode 30 in accordance with a preferred embodiment of the present invention. By way of example, ballast 18 is illustrated as comprising a Class-D power amplifier, such as the ballast described in commonly assigned, copending U.S. patent application of S.A. El-Hamamsy and J.C. Borowiec, Ser. No. 472,144, filed Jan. 30, 1990, which is incorporated by reference herein. The Class-D ballast includes two switching devices $Q_1$ and $Q_2$ connected in series with a dc power supply $V_{DD}$ in a half-bridge configuration. Switching devices $Q_1$ and $Q_2$ are illustrated as MOSFET's, but other types of switching devices having capacitive gates may be used, such as insulated gate bipolar transistors (IGBT's) or MOS-controlled thyristors (MCT's). Switching devices $Q_1$ and $Q_2$ are coupled to ballast driver 52 via input isolation transformers 53 and 54, respectively. In operation, the switching devices are driven alternately between cutoff and saturation such that one is conducting while the other one is turned off and vice versa. Hence, the Class-D ballast may be conveniently driven by a square wave signal. Alternatively, ballast driver 52 may comprise means for generating two out-of-phase sinusoidal signals, as described in U.S. patent application of S.A. El-Hamamsy and G. Jernakoff, Ser. No. 454,614, filed Dec. 21, 1989, which patent application is incorporated by reference herein.

A resonant load network is connected to the half-bridge at the junction between switching devices $Q_1$ and $Q_2$ and in parallel with switching device $Q_2$. The resonant load network comprises the excitation coil 16 of HID lamp 10 and a tuning capacitor $C_p$ connected in parallel therewith. (For clarity of illustration, coil 16 is not shown in its operational position about arc tube 14.) The parallel combination of capacitor $C_p$ and coil 16 functions as an impedance transformer to reflect the impedance of the arc discharge 20 into the ballast load. A blocking/tuning capacitor $C_s$ is connected in series with the parallel combination of coil 16 and capacitor $C_p$. In particular, capacitor $C_s$ is used both for blocking dc voltage and for resonant circuit tuning. As described in the El-Hamamsy and Borowiec patent application, cited hereinabove, capacitors $C_s$ and $C_p$ are chosen to ensure impedance matching for maximum efficiency.

An exemplary starting circuit 40, as illustrated in FIG. 3, comprises a resonant circuit, including the series combination of an inductance $L_o$ and a capacitance $C_o$, coupled to a high-efficiency RF power supply 60. Such a starting circuit is described in U.S. Patent application of S.A. El-Hamamsy and R.J. Thomas, Ser. No. 527,500, filed May 23, 1990, which patent application is incorporated by reference herein. The resonant circuit ($L_o$ and $C_o$) is tuned to the frequency of high-efficiency RF power supply 60 which provides RF power to initiate the arc discharge 20 in arc tube 14. Capacitance $C_o$ preferably comprises the parasitic capacitance between starter 12 and excitation coil 16. To ensure minimal coupling between ballast 18 and starting circuit 40, high efficiency RF power supply 60 is driven at a higher frequency than ballast 18. That is, an operating frequency for starting circuit 40 should be chosen to ensure that the tuned circuit comprising inductance $L_o$ and capacitance $C_o$ will not be excited by excitation coil 16 when the starting circuit is deactivated, i.e. after the arc discharge has been initiated. Moreover, the capacitively coupled starting current is extinguished without requiring movement of the starting probe. With ballast 18 being driven at 13.56 MHz, for example, a preferred operating frequency for starting circuit 40 is in the range from 15 to 40 MHz, with 27.12 MHz being a preferred frequency. At 27.12 MHz, exemplary values for capacitance $C_o$ and inductance $L_o$ and are 1-2 picofarads and 17-34 microhenries, respectively.

A suitable alternative starting circuit 40 is described in U.S. patent application of Cocoma et al., Ser. No. 07/622,024, cited hereinabove, which comprises a resonant LC circuit of variable impedance. Upon application of an RF signal to the excitation coil of the lamp, the starting circuit of Cocoma et al., Ser. No. 07/622,024, resonates to a sufficiently high voltage to initiate a discharge in the starting chamber which is capacitively coupled to the arc tube, thereby initiating an arc discharge therein. In another suitable alternative starting circuit, as described in U.S. patent application of Farrall et al., Ser. No. 07/622,246, cited hereinabove, the resonant circuit is retuned after initiation of the discharge in the starting chamber in order to ensure that a sufficiently high voltage is applied to the arc tube for initiating the arc discharge, even in relatively low-energy circuits.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A gas probe starter for an electrodeless high intensity discharge lamp of the type having an excitation coil situated about an arc tube for exciting an arc discharge in an ionizable fill contained in said arc tube, comprising:

a starting chamber having a wall enclosing an interior containing a gas, said starting chamber being attached to the outer wall of said arc tube;

a starting electrode disposed proximate to the portion of said starting chamber opposite to the portion that is attached to said arc tube for coupling a starting voltage to the interior of said starting chamber; and means for coupling said starting voltage to said starting electrode for initiating a discharge in said starting chamber that in turn initiates an arc discharge in said arc tube and for reducing said starting voltage after the arc discharge is initiated to such a level that no substantial leakage currents flow between said starting chamber and said arc tube.

2. The starter of claim 1 wherein the gas in said starting chamber comprises a rare gas selected from the group consisting of neon, argon, krypton, xenon, helium, and mixtures thereof.

3. The starter of claim 1 wherein the gas in said starting chamber is contained at a pressure in the range from approximately 0.5 to 500 torr.

4. The starter of claim 1 wherein the gas in said starting chamber is contained at a pressure in the range from approximately 5 to 40 torr.

5. The starter of claim 1 wherein the gas in said starting chamber is at a relatively low pressure as compared with the pressure of said fill.

6. The starter of claim 1 wherein said starting electrode extends into the interior of said starting chamber.

7. The starter of claim 1 wherein said starting chamber has a relatively wide portion and a relatively narrow portion, the wide portion of said starting chamber being attached to said arc tube.

8. The starter of claim 1, further comprising an additional electrode disposed proximate to the portion of said starting chamber that is attached to said arc tube.

9. An electrodeless high intensity discharge lamp, comprising:

a light-transmissive arc tube for containing a fill;

an excitation coil disposed about said arc tube and coupled to a radio frequency power supply for exciting an arc discharge in said fill;

a starting chamber having a wall enclosing an interior containing a gas, said starting chamber being attached to the outer wall of said arc tube;

a starting electrode disposed proximate to the portion of said starting chamber opposite to the portion that is attached to said arc tube for coupling a starting voltage to the interior of said starting chamber; and means for coupling said starting voltage to said starting electrode for initiating a discharge in said starting chamber that in turn initiates an arc discharge in said arc tube and for reducing said starting voltage after the arc discharge is initiated to such a level that no substantial leakage currents flow between said starting chamber and said arc tube.

10. The lamp of claim 9 wherein the gas in said starting chamber comprises a rare gas selected from the group consisting of neon, argon, krypton, xenon, helium, and mixtures thereof.

11. The lamp of claim 9 wherein the gas in said starting chamber is contained at a pressure in the range from approximately 0.5 to 500 torr.

12. The lamp of claim 9 wherein the gas in said starting chamber is contained at a pressure in the range from approximately 5 to 40 torr.

13. The lamp of claim 9 wherein the gas in said starting chamber is at a relatively low pressure as compared with the pressure of said fill.

14. The lamp of claim 9 wherein said starting electrode extends into the interior of said starting chamber.

15. The lamp of claim 9 wherein said starting chamber has a relatively wide portion and a relatively narrow portion, the wide portion of said starting chamber being attached to said arc tube.

16. The lamp of claim 9, further comprising an additional electrode disposed proximate to the portion of said starting chamber that is attached to said arc tube.

* * * * *